(12) United States Patent
Sammy

(10) Patent No.: US 8,461,713 B2
(45) Date of Patent: Jun. 11, 2013

(54) ADAPTIVE CONTROL DUCTED COMPOUND WIND TURBINE

(76) Inventor: Johann Quincy Sammy, Weymouth, MA (US)

( * ) Notice: Subject to any disclaimer, the term of this patent is extended or adjusted under 35 U.S.C. 154(b) by 307 days.

(21) Appl. No.: 12/820,130

(22) Filed: Jun. 21, 2010

(65) Prior Publication Data
US 2011/0037268 A1 Feb. 17, 2011

Related U.S. Application Data

(60) Provisional application No. 61/219,347, filed on Jun. 22, 2009.

(51) Int. Cl.
*F03D 9/00* (2006.01)
*H02P 9/04* (2006.01)
*F01D 1/24* (2006.01)

(52) U.S. Cl.
USPC .................... 290/55; 290/44; 415/60

(58) Field of Classification Search
USPC ........................ 290/44, 55; 415/60
See application file for complete search history.

(56) References Cited

U.S. PATENT DOCUMENTS

| | | | | |
|---|---|---|---|---|
| 2,153,523 A * | 4/1939 | Edmonds et al. | | 290/55 |
| 2,563,279 A * | 8/1951 | Rushing | | 415/4.3 |
| 4,021,135 A * | 5/1977 | Pedersen et al. | | 415/208.2 |
| 4,039,848 A * | 8/1977 | Winderl | | 290/55 |
| 4,075,500 A * | 2/1978 | Oman et al. | | 290/55 |
| 4,087,196 A * | 5/1978 | Kronmiller | | 415/4.5 |
| 4,204,799 A * | 5/1980 | de Geus | | 415/4.5 |
| 4,320,304 A * | 3/1982 | Karlsson et al. | | 290/55 |
| 4,324,985 A * | 4/1982 | Oman | | 290/55 |
| 4,482,290 A * | 11/1984 | Foreman et al. | | 415/207 |
| 4,684,316 A * | 8/1987 | Karlsson | | 415/211.1 |
| 4,720,640 A * | 1/1988 | Anderson et al. | | 290/43 |
| 5,464,320 A * | 11/1995 | Finney | | 415/60 |
| 5,506,453 A * | 4/1996 | McCombs | | 290/44 |
| 5,836,738 A * | 11/1998 | Finney | | 415/60 |
| 6,127,739 A * | 10/2000 | Appa | | 290/55 |
| 6,278,197 B1 * | 8/2001 | Appa | | 290/55 |
| 6,476,513 B1 * | 11/2002 | Gueorguiev | | 290/55 |
| 6,612,810 B1 * | 9/2003 | Olsen et al. | | 416/95 |
| 6,887,031 B1 * | 5/2005 | Tocher | | 415/1 |
| 6,945,747 B1 * | 9/2005 | Miller | | 415/4.3 |
| 6,952,058 B2 * | 10/2005 | McCoin | | 290/44 |
| 6,975,045 B2 * | 12/2005 | Kurachi et al. | | 290/44 |
| 7,098,552 B2 * | 8/2006 | McCoin | | 290/44 |
| 7,116,006 B2 * | 10/2006 | McCoin | | 290/54 |
| 7,217,091 B2 * | 5/2007 | LeMieux | | 416/95 |
| 7,218,011 B2 * | 5/2007 | Hiel et al. | | 290/43 |
| 7,220,096 B2 * | 5/2007 | Tocher | | 415/1 |
| 7,364,407 B2 * | 4/2008 | Grabau et al. | | 416/229 R |
| 7,372,172 B2 * | 5/2008 | Winkler et al. | | 290/43 |
| 7,384,239 B2 * | 6/2008 | Wacinski | | 416/128 |
| 7,582,981 B1 * | 9/2009 | Meller | | 290/44 |
| 7,637,715 B2 * | 12/2009 | Battisti | | 415/115 |
| 7,709,973 B2 * | 5/2010 | Meller | | 290/55 |
| 7,723,861 B2 * | 5/2010 | Meller | | 290/55 |
| 7,777,360 B2 * | 8/2010 | Hong | | 290/55 |
| 7,821,149 B2 * | 10/2010 | Meller | | 290/44 |
| 7,830,033 B2 * | 11/2010 | Meller | | 290/55 |

(Continued)

*Primary Examiner* — Pedro J Cuevas

(57) ABSTRACT

A high efficiency, adaptive control, compound ducted wind turbine capable of providing higher efficiency in energy extraction from a fluid. Performance of efficiency expressed as coefficient of performance (Cp) in accordance with the Lanchester-Betz-Joukowski limits is sustainable and significantly higher than an un-ducted, mono-propeller wind turbine of comparable diameter.

12 Claims, 14 Drawing Sheets

U.S. PATENT DOCUMENTS

| | | | |
|---|---|---|---|
| 7,923,854 B1* | 4/2011 | Meller | 290/55 |
| 7,928,594 B2* | 4/2011 | Shreider et al. | 290/54 |
| 7,976,269 B2* | 7/2011 | Presz et al. | 415/4.3 |
| 7,976,270 B2* | 7/2011 | Presz et al. | 415/4.3 |
| 7,980,811 B2* | 7/2011 | Presz et al. | 415/4.3 |
| 8,021,100 B2* | 9/2011 | Presz et al. | 415/4.3 |
| 8,022,567 B2* | 9/2011 | Davis et al. | 290/54 |
| 8,026,626 B1* | 9/2011 | Meller | 290/55 |
| 8,178,991 B2* | 5/2012 | Smith | 290/55 |
| 8,178,992 B1* | 5/2012 | Meller | 290/55 |
| 2005/0242233 A1* | 11/2005 | Battisti | 244/58 |
| 2006/0018752 A1* | 1/2006 | LeMieux | 416/96 R |
| 2007/0243066 A1* | 10/2007 | Baron | 416/132 B |
| 2010/0068029 A1* | 3/2010 | Presz et al. | 415/1 |
| 2010/0068052 A1* | 3/2010 | Werle et al. | 415/220 |
| 2010/0080683 A1* | 4/2010 | Presz et al. | 415/4.3 |
| 2010/0086393 A1* | 4/2010 | Presz et al. | 415/1 |
| 2010/0119370 A1* | 5/2010 | Myhr | 416/39 |
| 2010/0166547 A1* | 7/2010 | Presz et al. | 415/200 |
| 2010/0189560 A1* | 7/2010 | Haraguchi | 416/1 |
| 2010/0247289 A1* | 9/2010 | Presz et al. | 415/4.3 |
| 2010/0284802 A1* | 11/2010 | Presz et al. | 415/182.1 |
| 2010/0314885 A1* | 12/2010 | Presz et al. | 290/55 |
| 2010/0316487 A1* | 12/2010 | Presz, Jr. | 415/121.3 |
| 2011/0002781 A1* | 1/2011 | Presz et al. | 415/211.2 |
| 2011/0008164 A1* | 1/2011 | Presz, Jr. | 415/211.2 |
| 2011/0014038 A1* | 1/2011 | Werle et al. | 415/200 |
| 2011/0020107 A1* | 1/2011 | Presz et al. | 415/4.1 |
| 2011/0020110 A1* | 1/2011 | Presz et al. | 415/121.3 |
| 2011/0027067 A1* | 2/2011 | Kennedy et al. | 415/4.1 |
| 2011/0058937 A1* | 3/2011 | Presz et al. | 415/191 |
| 2011/0274533 A1* | 11/2011 | Presz et al. | 415/1 |
| 2012/0282092 A1* | 11/2012 | Swist | 416/1 |
| 2012/0301283 A1* | 11/2012 | Presz et al. | 415/182.1 |
| 2012/0306212 A1* | 12/2012 | Sarmiento Munoz et al. | 290/55 |
| 2012/0315125 A1* | 12/2012 | Presz et al. | 415/1 |

* cited by examiner

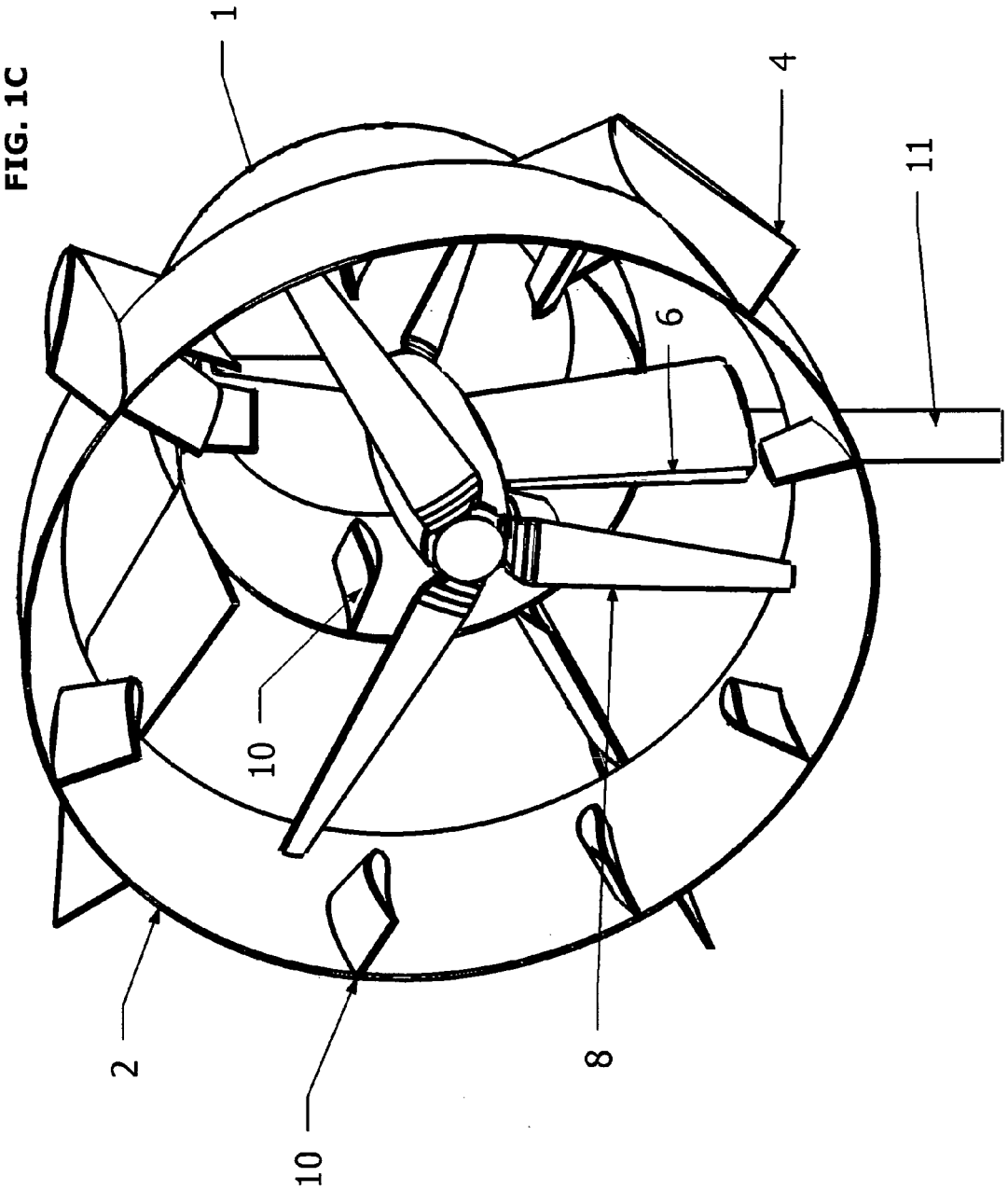

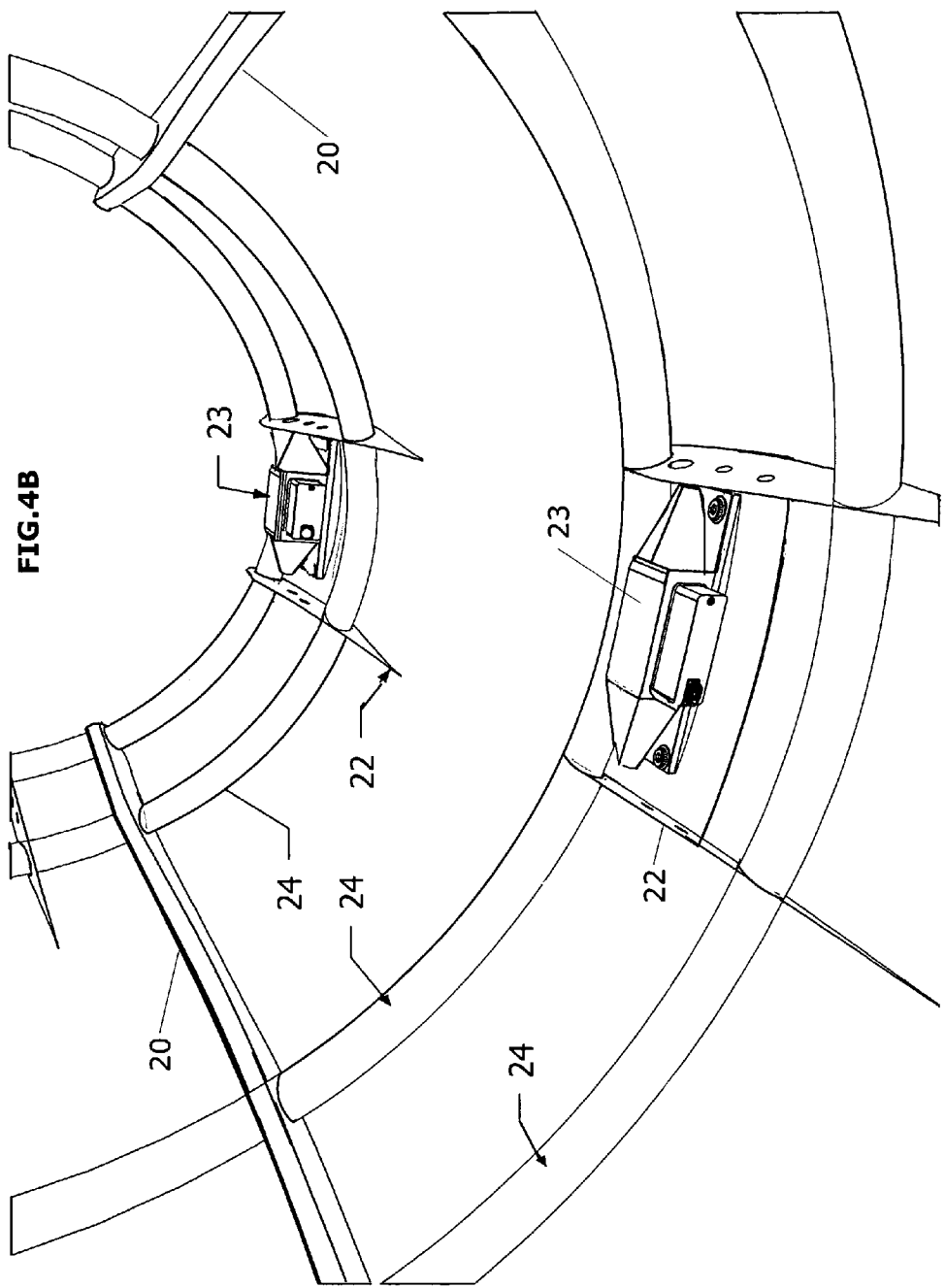

ADAPTIVE CONTROL DUCTED COMPOUND WIND TURBINE

RELATED APPLICATIONS

This application is related to provisional application Ser. No. 61/219,347, "High Efficiency Ducted, Compound Rotor Turbine", Sammy, filed on Jun. 22, 2009 and claims priority therefrom.

BACKGROUND

1. Field

This disclosure relates to wind turbines and wind collectors for horizontal axis wind turbines (HAWT) that are designed to harvest energy from the wind and transmit electrical energy to power storage or sent directly to end user for immediate energy consumption (grid-tied). More particularly, the present disclosure describes a compound rotor wind turbine that is enclosed within two separate annulus (annular wings) to provide for higher efficiencies in wind energy extraction based on coefficient of performance derived from the Lanchester-Betz-Joukowski limit.

2. Description of Related Art

Horizontal Axis Wind Turbines (HAWT) has been largely dominated by un-ducted/shrouded, mono-propeller turbine (s) as the primary configuration for wind energy extraction. The first documented patent for ducted/shrouded diffusers was the "Eolienne Bollée", issued to Ernest Sylvain Bollée and Auguste Sylvain Bollée of France in 1868, #79985 and revised in 1885-#167726. The Eolienne Bollée consisted of fixed stator(s) preceding the rotor enclosed within a duct. Diffuser Augmented Wind Turbines (DAWTS) pioneered by Grumman Aerospace, a type of HAWT, U.S. Pat. No. 4,075,500, "Variable Stator Diffuser Augmented Wind Turbine Electrical Generation System" issued Feb. 21, 1978 to Oman & Foreman describes a diffuser/shrouded augmented wind turbine with variable stators preceding the rotors to control flow onto the rotors and yaw alignment of the turbine system. The diffuser shroud which encases the vanes and rotors is as such where the inlet shroud for vane & rotor placement is significantly less in diameter than the flanged diffuser exit. Such design claims to induce lower pressure along the back face, trailing edge area, downstream of the spinning rotors thereby improving rotor efficiency and rotor rpm as well as augmenting mass flow entering ahead of the rotor blades which facilitates more power extraction from the usable wind supply per rotor diameter.

A second DAWT type system for HAWT is proposed by U.S. Pat. No. 7,018,166, "Ducted Wind Turbine", issued Mar. 28, 2006 to Gaskell featuring another diffuser shroud with two rotors, primary inlet rotor and second free rotor mounted downstream of the first rotor, outside of the diffuser shroud periphery. The blade tips of the free/second rotor are in the free-stream wind and a portion of the free or second rotor is exposed to the diffuser with supplemental force coming from the low pressure flow exiting the forward diffuser shroud. Both rotors are mechanically connected to a primary, generator. These types of diffuser/shrouded turbines have a primary purpose and that is concentrating or augmenting mass flow of the wind via the duct/shroud to improve rotor efficiency at the throat of a convergent/divergent diffuser for maximum velocities.

A problem common to diffuser type shrouds is flow separation from the shroud inner surface walls which negates the benefit of the diffuser shroud and causes pressure rise which may adversely affect rotor/propeller performance and thus harm efficiencies. Further, problems and complications of the diffuser design (DAWT) is the large exit to inlet (or nozzle to exit) diffuser ratios required, to form lower pressure gradients at exit. Additionally, low aspect ratio ducts, shrouds and diffuser in relation to the nozzle and exit area has led to problems with buffeting, yaw control due to air entrainment and high drag systems inherent in the design (higher pressure). Turbulent flow fields are also generated at the exit ducts of DAWTS, leading to efficiency and performance losses due to the increased diameter of irrotational and expanding wake flow.

Other concentrated wind systems or diffuser type systems for flow efficiency improvement in wind turbines, include prior art that attempt to maintain boundary air layer attachment at the diffuser walls by including orifices to re-direct free-stream airflow such as U.S. Pat. No. 4,075,500, previously cited, and U.S. Pat. No. 4,422,820, "Spoiler for Fluid Turbine Diffuser", issued Dec. 27, 1983 to Kirsch & Markow. U.S. Pat. No. 5,836,738, "Advanced SuperVenturi Power Source", Finney, describes three separate annulus merging flows to combine a singularity in flow stream to drive an actuator disk or turbine at the highest possible flow efficiency. All prior art of ducted (concentrator type)/diffuser augmented wind turbines (DAWTS) still do not address the problem of expanding irrotational wake flow that can disrupt flow and wind supply in a wind turbine array and lead to lower overall performance and degradation of efficiency of proximate wind turbines sited in wind farms because of turbulent flow. Furthermore, ducted/shrouded turbines of the prior art are prone to ice formation in freezing conditions due to the increase in wetted area of the duct. Ice-build up causes gross inefficiency and performance losses as the result of flow separation, blockage and change of surface geometry from ice accumulation.

The proposed art, Adaptive Control Ducted Compound Wind Turbine, takes a multidisciplinary approach to the design configuration, integrating ducted fan technology (aviation-aerodynamics), specifically the use of a positive cambered duct (airfoil geometry), vortex generators, internal duct heating to prevent ice formation, fixed and variable stator vane(s) and nacelle to augment, streamline and disrupt fluid flow in ducted fan/ducted wind turbine systems. The present embodiment and utility application is a continuation of U.S. Provisional Patent Application 61/219,347, "High Efficiency Ducted, Compound Rotor Turbine", Sammy (also author of present embodiment), describes a novel configuration for a ducted wind turbine applying ducted fan technology.

3. Background Description of Physical Operation of Wind Turbines:

The theory predicting the maximum amount of useful power that can be extracted from fluid flow was first written by English aerodynamicists, F. W. Lanchester in 1915. In 1920 Alfred Betz, a German aerodynamicist, and Nikolai Zhukovsky also spelled Joukowski, a Russian aerodynamicist, both published their results independently on the same body of work relating to maximum power extraction from fluid flow in an propeller or airscrew. History has long recognized the Betz Limit, so named for Alfred Betz's publication in 1920 as the governing law of power extraction from fluid flow in wind turbines. In fairness to past researchers, all came to the same conclusion independently that the useful amount of power that can be extracted from fluid flow within a streamtube is 59.265% or as expressed as a coefficient of performance, $C_p=0.593$.

The reference to the maximum limit will then be cited throughout this publication as the Lanchester-Betz-Joukowski limit. Further work by Froude and Glauert resulted in reference to the wind turbine as an actuator disk, propeller/airscrew, deriving an axial induction factor (losses) of 33.33%, 0.3333 or ⅓. The axial induction factor represents the amount of losses of kinetic energy in the wind that is converted to heat then dissipated through viscous shear as it passes the actuator disk within the stream tube. ⅔ of the kinetic energy in the wind is then available for useful power extraction.

Further loss of efficiencies lowering coefficient of performance in wind turbines un-ducted/ducted is due but not limited to propeller, generator, gearbox, and transmission inefficiencies, and poor yawing reaction control—a function of unsteady aerodynamics in wind turbines.

4. Background Description of Non-Planar Surfaces/Wings:

Annular Wings are non-planar surfaces that may have a toroidal geometry in its most basic form. The benefit of non-planar wings have been documented theoretically and experimentally. Much research has shown that non-planar surfaces (annular wings, a.k.a. ring wings) significantly reduce wave drag due to high Oswald (span wise) efficiencies. Early study on non-planar wings conducted by Prandtl and Munk investigated the physics and determined theoretical calculations for non-planar wings in the form of bi-planes. Non-planarity for confined wingspan improves wing efficiency by capturing a larger volume of air to generate lift.

BRIEF DESCRIPTION OF THE DRAWINGS

FIGS. 1A-1E depict the two positive cambered annulus, ducts, compound turbine-propellers, vanes, nacelle, vortex generators, strakes, generators and inverters, electro-mechanical airfoil rotation apparatus, and general arrangement of the complete system in perspective, side and front views.

FIGS. 4A and 4B depicts a framed view of the embodiment with internal heating units.

DESCRIPTION OF PREFERRED EMBODIMENT

Figure 1A:
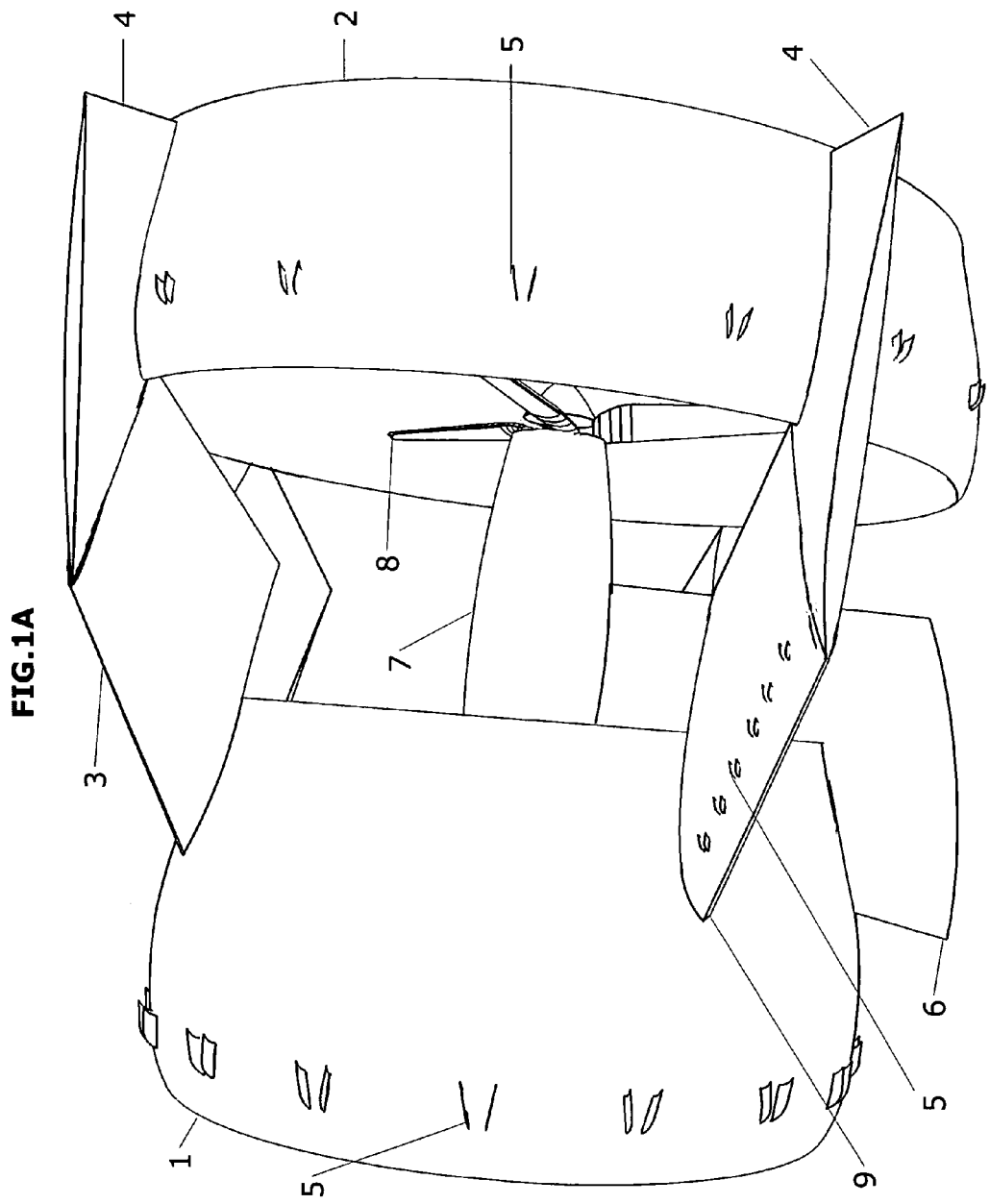

Embodiments of the present invention provide for a compound, dual annulus/annular wing, counter rotating propeller blades, dual rotor/turbine system, consisting of variable and/or fixed vanes on the inner walls, horizontal and vertical stabilizers connecting the forward and after ducts, and vortex generators for flow attachment along the inner/outer duct walls circumferentially arranged for efficient harvesting of wind energy. The performance of rotors/propellers/fans within a shroud or duct improve turbine efficiency by minimizing losses at the rotor/propeller tip, provided suitable clearance between the propeller tip and shroud are met in these axial flow systems.

Ducted propellers/ducted fans provide high static thrust per rotor diameter than an un-ducted propeller. Un-ducted, mono-propeller HAWT turbines deflect away a significant portion of the incoming free-stream resulting in lower turbine efficiency and power production and vortex shedding also creates turbulence at the blade tip. As well, flow efficiencies are also lost in un-ducted, mono-propeller systems as wind flow passes through the propeller in these axial flow systems. The energy in the wind that is lost due to deflection, tip clearance, vortex shedding, and flow through the propellers cannot be recovered and extracted in conventional un-ducted, mono-propeller systems.

Lanchester-Betz-Joukowski law limits the maximum energy conversion efficiency of 59.23% when the axial wind speed is reduced by ⅔rd across a single rotor disc. However, practical wind turbines convert significantly less than 40% of the power available in the wind per rotor sweep area into electrical energy. Hence, nearly 60% of the potential wind power per rotor swept area escapes without being harnessed. The primary reason may be that a single rotor cannot be designed to achieve large changes in velocity or enthalpy. However, a compound turbine system provides more rotor sweep area than a single, mono-propeller system of the same diameter. The power output of a wind turbine is directly related to the swept area of its blades. The larger the diameter of its blades, the more power it is capable of extracting from the wind. Power captured by the rotor is linear. If the swept area is doubled as in the present embodiment, then so to be the amount of energy it can capture.

One embodiment of the present invention is the use of counter rotating, dual turbine/propellers to increase energy harvesting through enlarged sweep area. The counter-rotating system reduces bending stress on the tower on which the turbine system may be mounted. This reduced bending stress results when the torques produced by two rotors counterbalance each other.

The present embodiment of positive cambered annulus ducts is designed to maximize the flow field along the inner duct wall and also at the outer duct walls for the benefit of streamlining flow through the duct (maintain flow attachment) and to direct high velocity flow to the after turbine tips to begin rotation, as well as maintain a low pressure area downstream of the forward propeller.

Free-stream wind flow approaching the embodiment in practical operation is often turbulent flow. Unsteady aerodynamics in the form of wind shear, rapidly shift cross-wind, gusting winds, and gale force wind is a cause of flow separation common to ducted/shrouded/diffuser turbines.

Vortex generators are commonly used in aviation, situated along the leading edge as a percentage to chord to delay flow separation. Flow separation can be a potential problem in ducted as well as un-ducted wind turbine systems. Vortex generators delay flow separation. Vortex generators are positioned in the annulus leading edge annular wing and are affixed in such a way that they have an angle of attack a.o.a. with respect to the local airflow. In addition, the use of vortex generators augment the stream wise vorticity within a separating boundary layer, increasing the fluid momentum near the surface and thus delaying separation.

The vortex generators create a tip vortex which draws energetic, rapidly-moving air from outside the slow-moving boundary layer into contact with the annulus skin. The boundary layer normally thickens as it moves along the annulus inner/outer surface, creating areas of high pressure. Vortex generators remedy this problem by re-energizing the boundary layer at the annulus inner/outer surfaces. In the annulus, vortex generators delay flow separation and aerodynamic stalling. This benefit translates into lower pressure areas behind the turbine rotors, which directly improve rotor efficiency. Vortex generators are also positioned span wise along the inner/outer guide vanes to delay flow separation as the flow downstream of the forward propeller is de-swirled straightened, accelerated and directed onto the after turbine by the inner/outer vanes. The vanes are positioned as to redirect the flow in the opposite rotation of the forward turbine plane of rotation.

Airfoil design for the annular wings may consist of a specific geometry. Optimal loaded airfoils are laminar type airfoils. Further, wind tunnel test using a variant of the NASA supercritical body of revolution class airfoil for the annular wings exhibited lift coefficients of 1.2 to 1.5 at wind speeds up to 165 mph from angles of attack ranging from 0 to 10 degrees.

FIG. 1A left side views show the complete arrangement of the present embodiment in series order facing the oncoming wind. The forward annulus 1 and FIG. 1B forward rotor propeller turbine fan 8.1 is of shorter diameter and the forward annulus 1 is generally of longer chord than the after annulus 2 which is generally of larger diameter and may be of shorter chord than the forward annulus 1 to expose an optimum percent span of the propeller/turbine/rotor blades within the periphery of the after annulus 2 to the on-coming free stream wind, but be placed outside the periphery of the forward annulus 1. The after propeller 8 is typically of larger diameter than the forward propeller 8.1 depicted in FIG. 1B to maintain blade tip (span wise) placement outside the periphery of the forward annulus 1 but within the periphery of the after annulus 2. Vortex generators 5 are positioned along the leading edge upper surface of the lower horizontal stabilizers 9 and along the forward 1 and after annular wing 2 leading edge upper surfaces. The upper vertical stabilizer 3 arranges for passive yaw of the embodiment. The after annular wing 2 strakes 4 direct the outer flow across the top surface of the after annular wing 2.

Figure 1B:
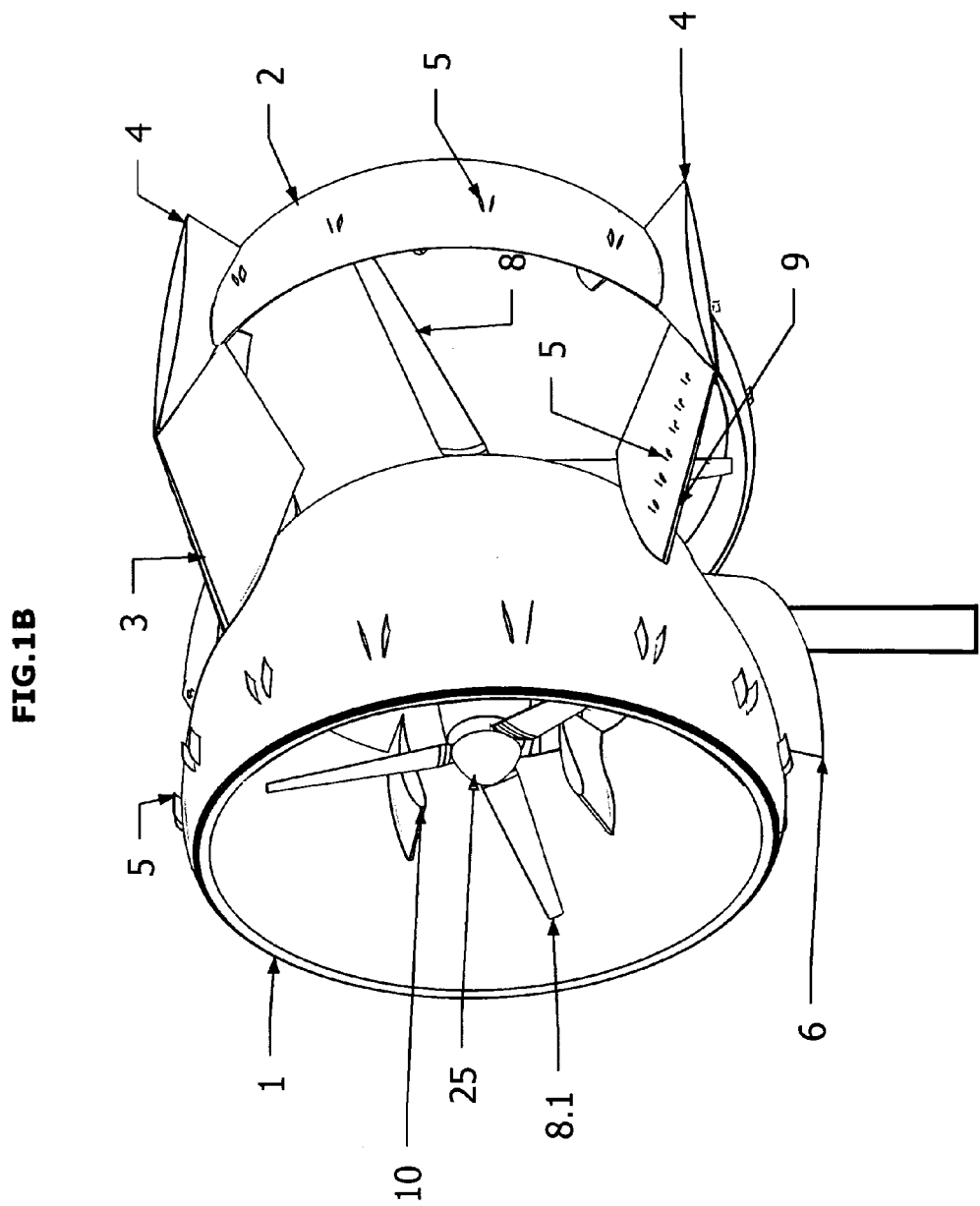

The spinner assembly depicted in FIG. 1B 25 directs the oncoming free steam wind up and toward the forward propeller 8.1 to streamline flow onto the propeller face. The nacelle 7 houses the generators, gearboxes, drive-shafts and a majority of all other internal accessories and equipment (not shown) deemed necessary for operation of the present embodiment. The nacelle 7 is a conical shape airfoil. The present embodiment depicts a Sears-Haack type body, which has known properties of low wave drag.

FIG. 1B illustrates two cantilevered upper vertical stabilizers 3 positioned between the forward annular wing 1 mid body and after annular wing 2 leading edge is part of the yaw reaction control system. The vertical stabilizer 3 may be passively oriented which would include fixed mount to the after annulus 2 at varying angles of incidence from 0 to 25 degrees. The vertical stabilizer 3 passively aligns with the wind due to its broad surface area rising vertically and cantilevered. Extending horizontally aft taking a streamlined geometry as depicted in FIG. 1B, the vertical stabilizers 9 may be actively controlled via direct drive servo-actuator motor (not shown) along the yaw axis for active yaw control with the use of gyroscopic devices, accelerometer and anemometers. The lower horizontal stabilizers 9 is positioned between the forward annular wing 1 lower mid body and after annular wing 2 lower leading edge is part of the pitch reaction control system to the vertical stabilizer 3 and extends outwardly in opposing directions perpendicular to the vertical stabilizer 3. The horizontal stabilizer 9 minimizes pitching and buffeting from the free-stream wind which may be the result of the annulus 1 and 2. The horizontal stabilizer 9 is positioned aft of the center of gravity of the complete system illustrated in FIG. 1A and FIG. 1B and is anhedral in span wise planform.

Figure 3A:
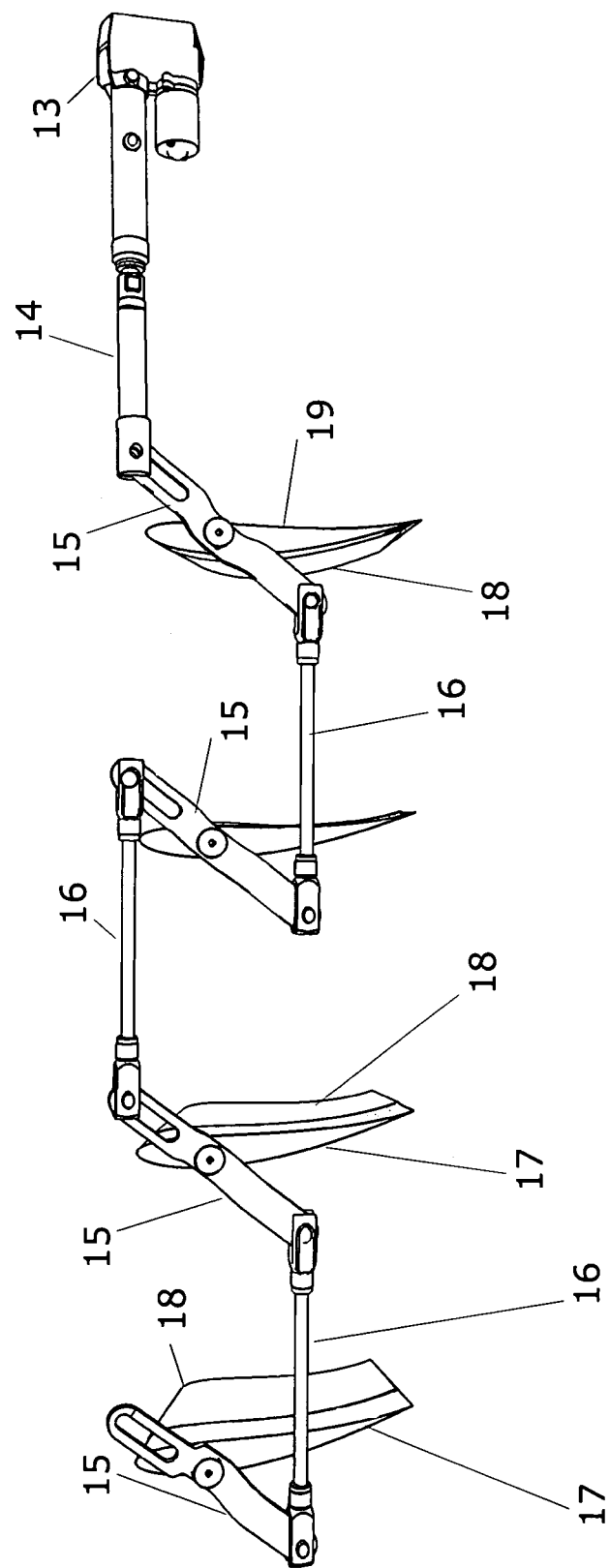
FIGS. 3A-3C illustrate the stator vanes, fixed and variable with method of actuation.
Figure 3B:
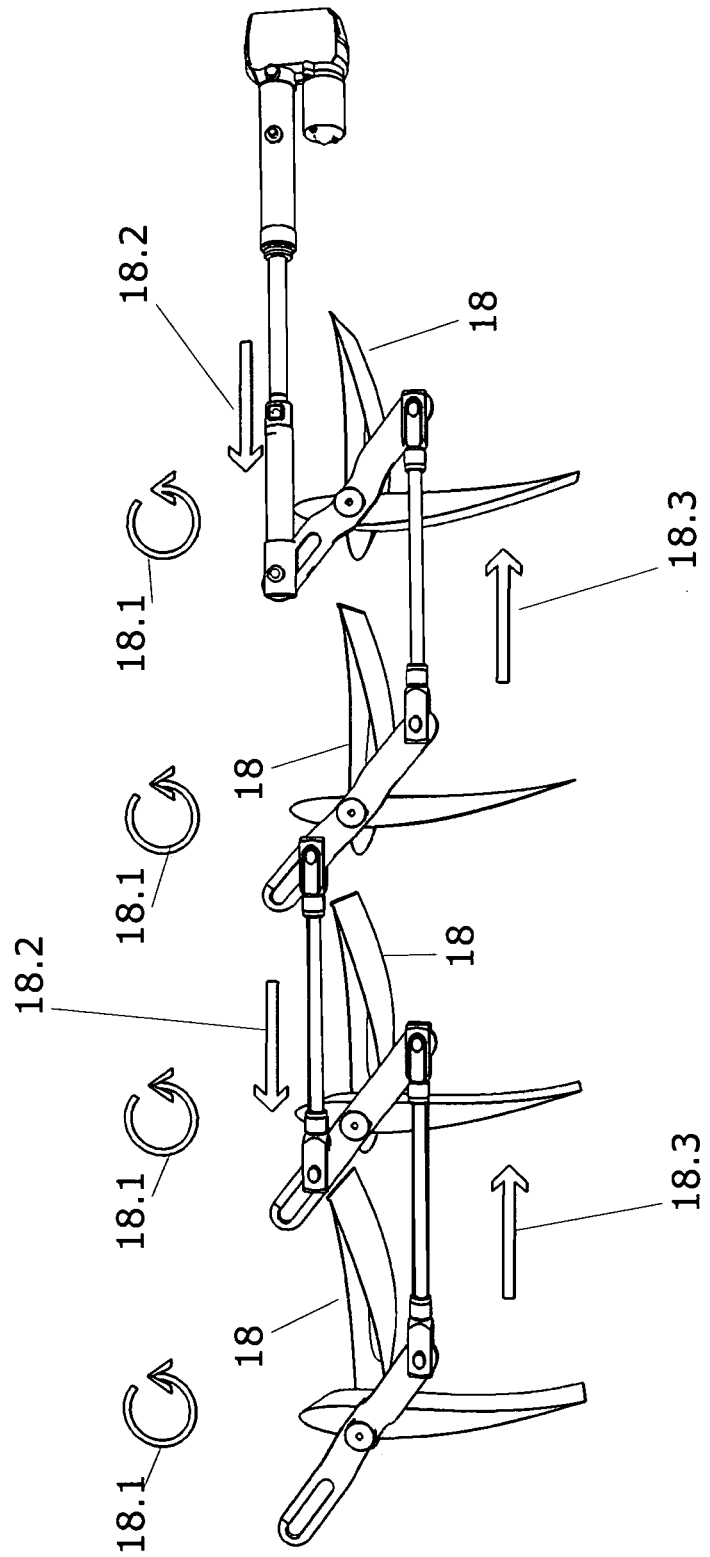
Figure 3C:
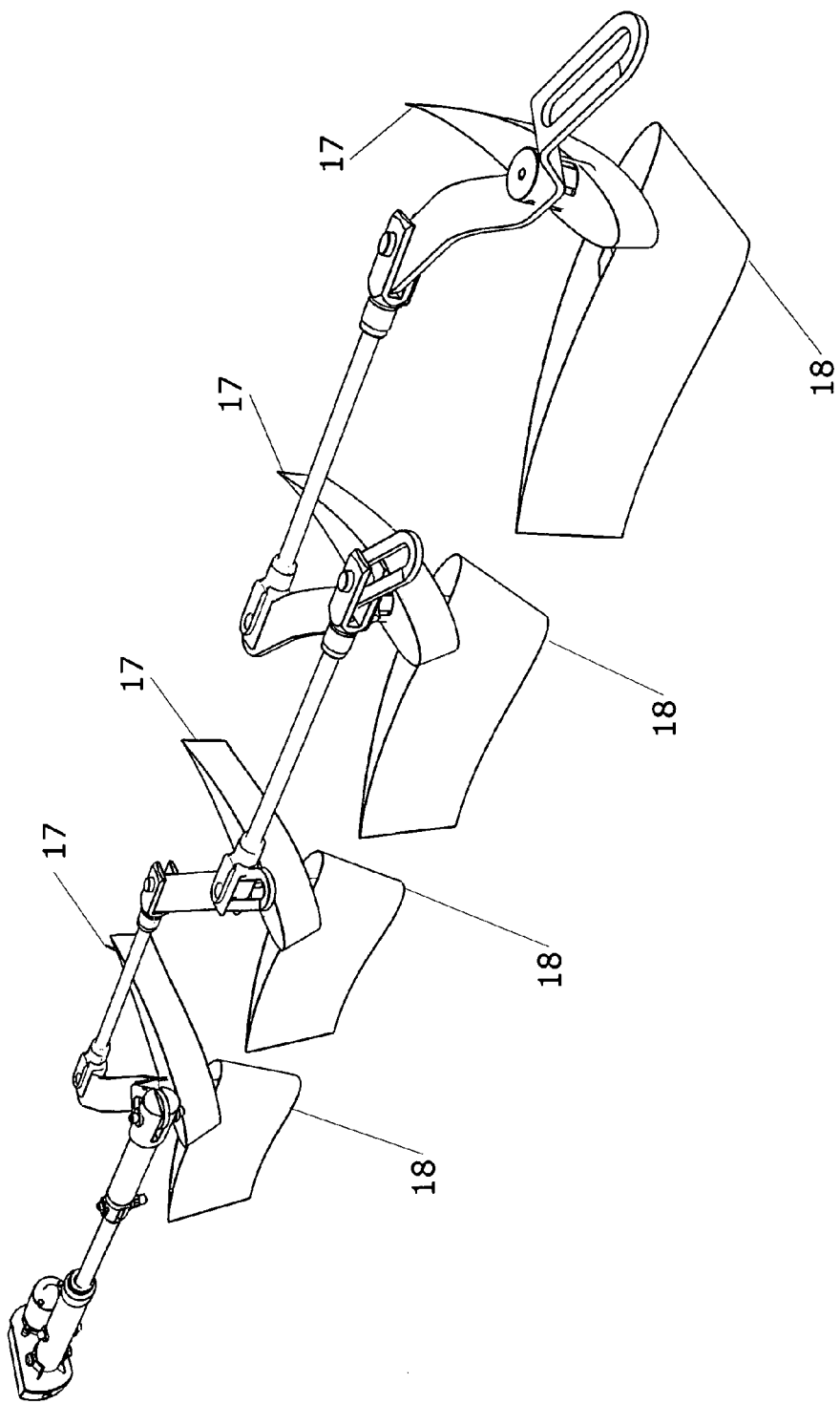

The present embodiment, FIG. 1C, rear view looking forward, is mounted on a tower support structure 11 in such a manner that is fixed mounted with accommodation for passive yaw control or 360 degree rotation. The present embodiment as depicted in FIGS. 1A-1C is designed as a modular unit with all systems attached and when mounted to a separate detached tower 11 or other support structure, it is affixed through coupling (not shown) with freedom of rotation along its yaw axis. The entire embodiment as shown in FIGS. 1A-1D is mounted at an optimal angle of attack relative to the oncoming wind direction. A plurality of stator vanes 10 is depicted and are arranged circumferentially to the tangent slipstream wake flow of the propeller. The stator vanes 10 are mounted so that the suction side of the airfoil or upper surface of the airfoil is in contact with the contra-rotating wake of the propellers 8 and 8.1, FIG. 1B and streamlines or straightens this contra-flow returning it laminar. The vanes 10 FIGS. 1B-1C may be fixed mounted or variably mounted and sensor controlled for optimal propeller 8 and 8.1 FIG. 1B loading and to disrupt expanding flow fields in a wind turbine array through actuation of the variable stator vanes 17 and 18 as illustrated in FIGS. 3A-3C.

FIG. 1C also illustrates the separate tower 11, strake 4, forward annulus 1, after annulus 2, stator guide vanes 10 in rear looking forward view. Arranged circumferentially on the outer wall of the forward annulus 1 trailing edge are a plurality of stator guide vanes 10 tangentially spaced. The pluralities of stator guide vanes 10 direct, accelerate, and de-swirl the turbulent free stream wind exiting the forward 1 and the after annular wing 2.

Figure 1D:
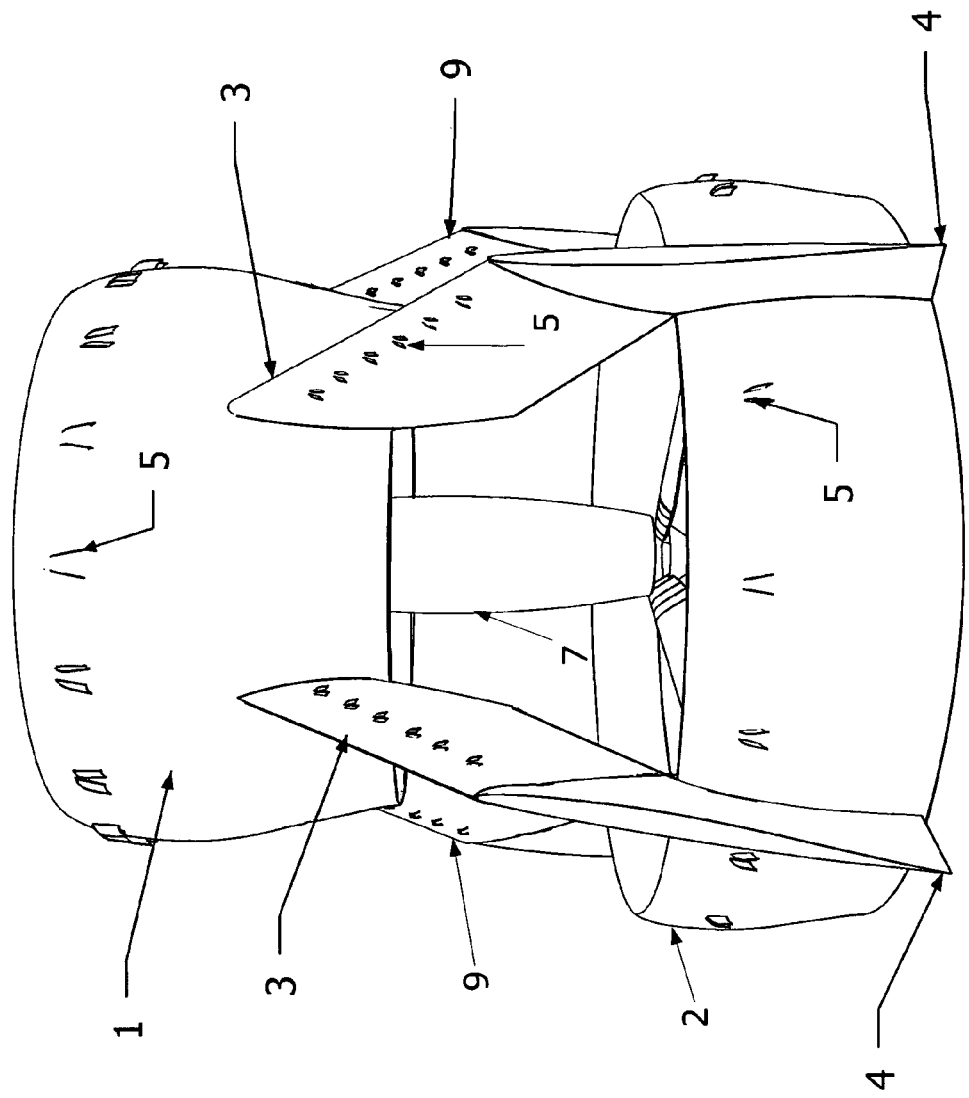

FIG. 1D depicts a top view of the complete present embodiment. A plurality of outer surface vortex generators 5 in pairs are arranged circumferentially as a percentage to chord and boundary layer to maintain laminar flow attachment on the annular wings 1 and 2, horizontal stabilizers 9, and vertical stabilizers 3.

Figure 1E:
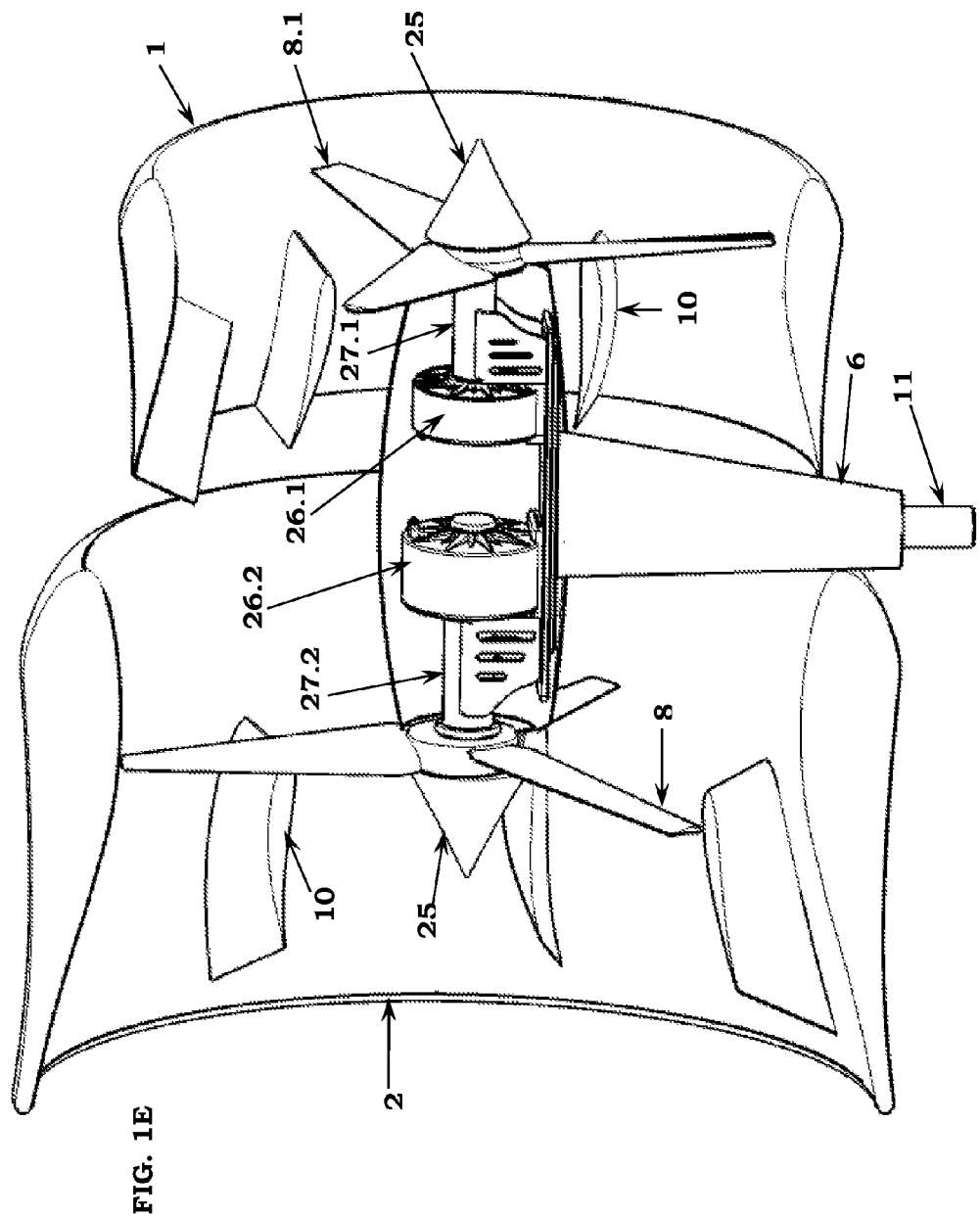

As shown in FIG. 1E the wind turbine is typically equipped with generators 26.1 and 26.2 and inverters 27.1 and 27.2 respectively connected to the forward and rear turbines.

Figure 2A:
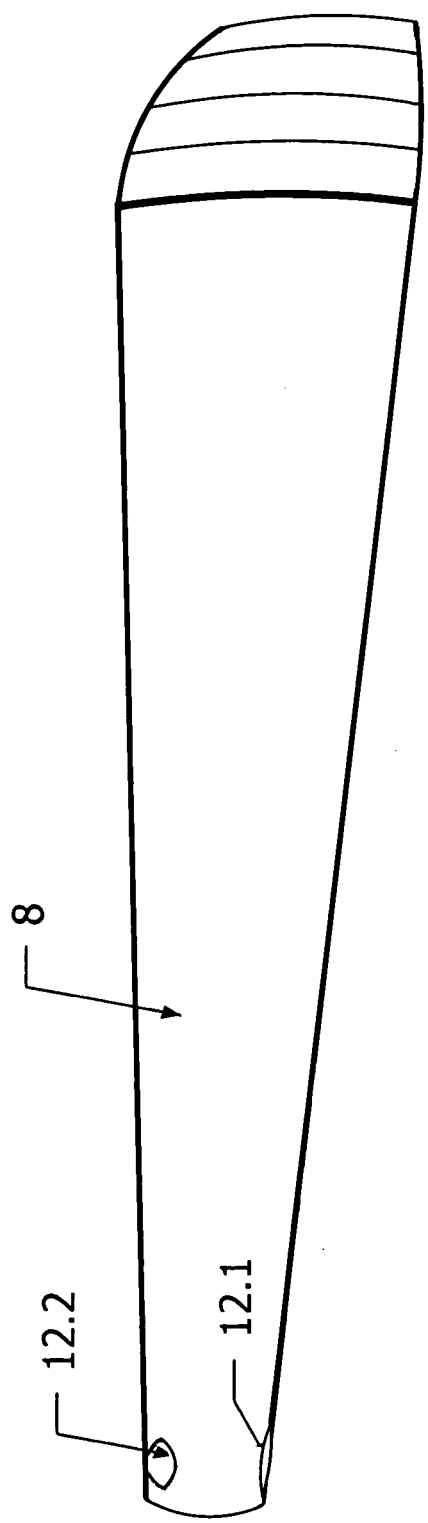
FIGS. 2A-2C depicts planform view, perspective and side view of the propeller with non-planar elliptical winglet.
Figure 2B:
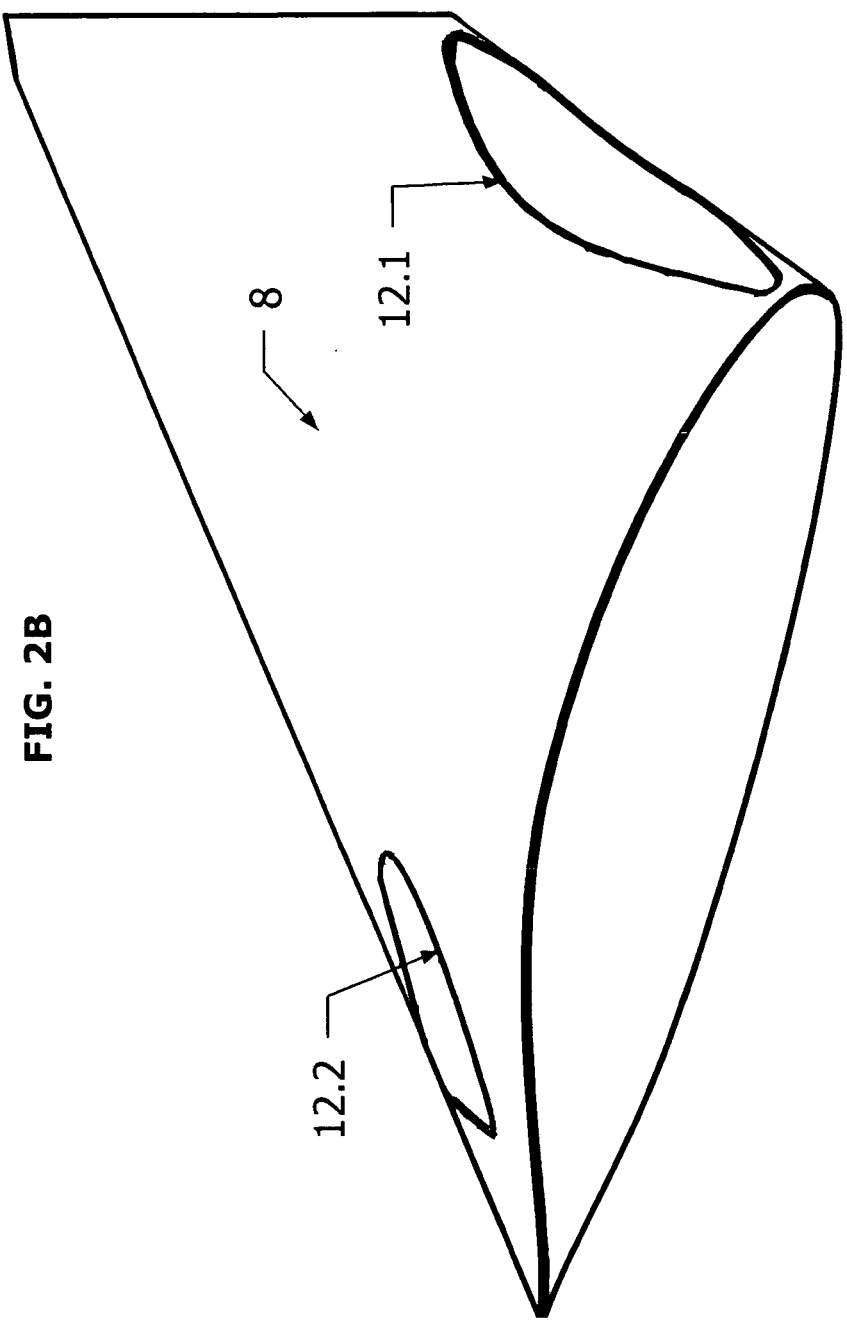
Figure 2C:
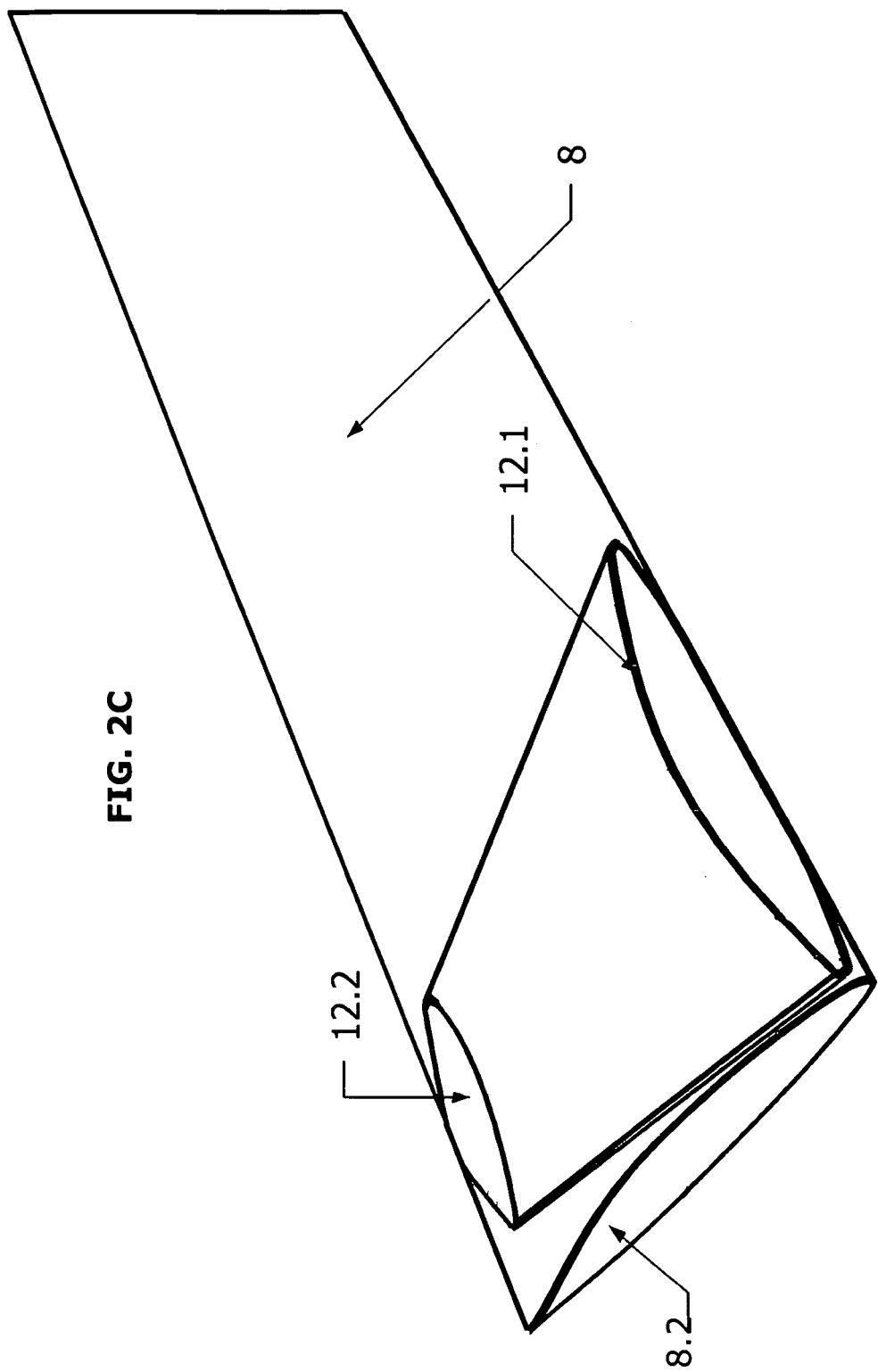

FIG. 2A is a top planform view of the non-planar elliptical winglet 12.1 and 12.2 and propellers 8 and 8.1 as shown in FIG. 1B. Whereby, the forward elliptical diameter/entrance 12.1 of the winglet geometry is of greater diameter than of the exit 12.2. The benefit of this type of winglet configuration 12.1 and 12.2 facilitates faster moving air through the cross-section of the winglet which when fluid is exiting draws slower moving air/fluid away from the wing tips by creating fast moving vortices—the Venturi effect. Downwash, vorticity and flow re-circulation at the trailing edge is then reduced as trailing vorticity is displaced from the plane at the tip of the propeller. FIG. 2B is a perspective, partial view of the propeller 8 and 8.1 depicted in FIG. 1B non-planar elliptical winglet 12.1 and 12.2, illustrating the blended recession of the non-planar elliptical winglet 12.1 and 12.2 into the tip of the propeller 8 and 8.1 airfoil geometry. FIG. 2C is a perspective cut away, partial top view of the non-planar elliptical winglet entrance 12.1 and exit 12.2 depicting the Venturi flow cross-section of the winglet 12.1 and 12.2 and airfoil geometry 8.2.

FIG. 3A is a representative view of the stator vanes 10 FIGS. 1B-1C with variable operation. The variable vanes 18 depicted in FIGS. 3B and 3C are in the closed position. A linear actuator/servo actuator 13 with a connecting linkage-strut 14 is attached to a stator vane crank arm 15 on the leading edge side of the variable stator vane crank arm 15. On the trailing edge side of the variable stator vane crank-arm 15, push pull rods 16 connects to another stator vane crank arm 15 in series and such series configuration can expand to a plurality of variable stator vanes 18 and fixed vane roots 17. The stator vane crank arm 15 is pivotally mounted via rod 19 to the stator vane fixed root 17 and the rod 19 is fixed mounted to a lower body of revolution—the actuation portion 18 of the stator vanes 17 and 18. As depicted in FIG. 3B, when the actuator rod FIG. 3A, 14 extends as indicated in the direction of travel by arrow 18.2, the connecting series of push-poll rods 16 FIG. 3A affixed to the bell crank arms 15, FIG. 3A, also move in the direction of arrow 18.2 and the variable body of revolution of the stator vane 18 pivots from 0 to 90 degrees as indicated by direction of travel arrows 18.1. The push-pull rods FIG. 3A, 16 and linkages mounted on the trailing edge side of the variable stator vanes FIGS. 3A, 17 and 18 move in the direction as indicated by arrow 18.3, which is opposite the direction of travel of arrows 18.2. Variable stator vanes FIGS. 3A, 17 and 18 are mounted in the lower surface of the annular wings FIGS. 1A-1D 1 and 2, circumferentially to the tangent wake flow and serve to disrupt fluid flow in the slipstream of the propellers, creating a pressure rise, which in turns slows propeller rpm. The variable stator vanes FIGS. 3A-3C, 17 and 18 act as aerodynamic brakes to the propeller 8 and 8.1, FIG. 1B, when in full closed position, as depicted in FIGS. 3B-3C, propeller as shown in FIGS. 1B, 8 and 8.1 operation is severely limited and slowed resulting in significant reduction of the propeller rpm. FIG. 3A is a top perspective view of the variable stator vanes in the full open position.

Figure 4A:
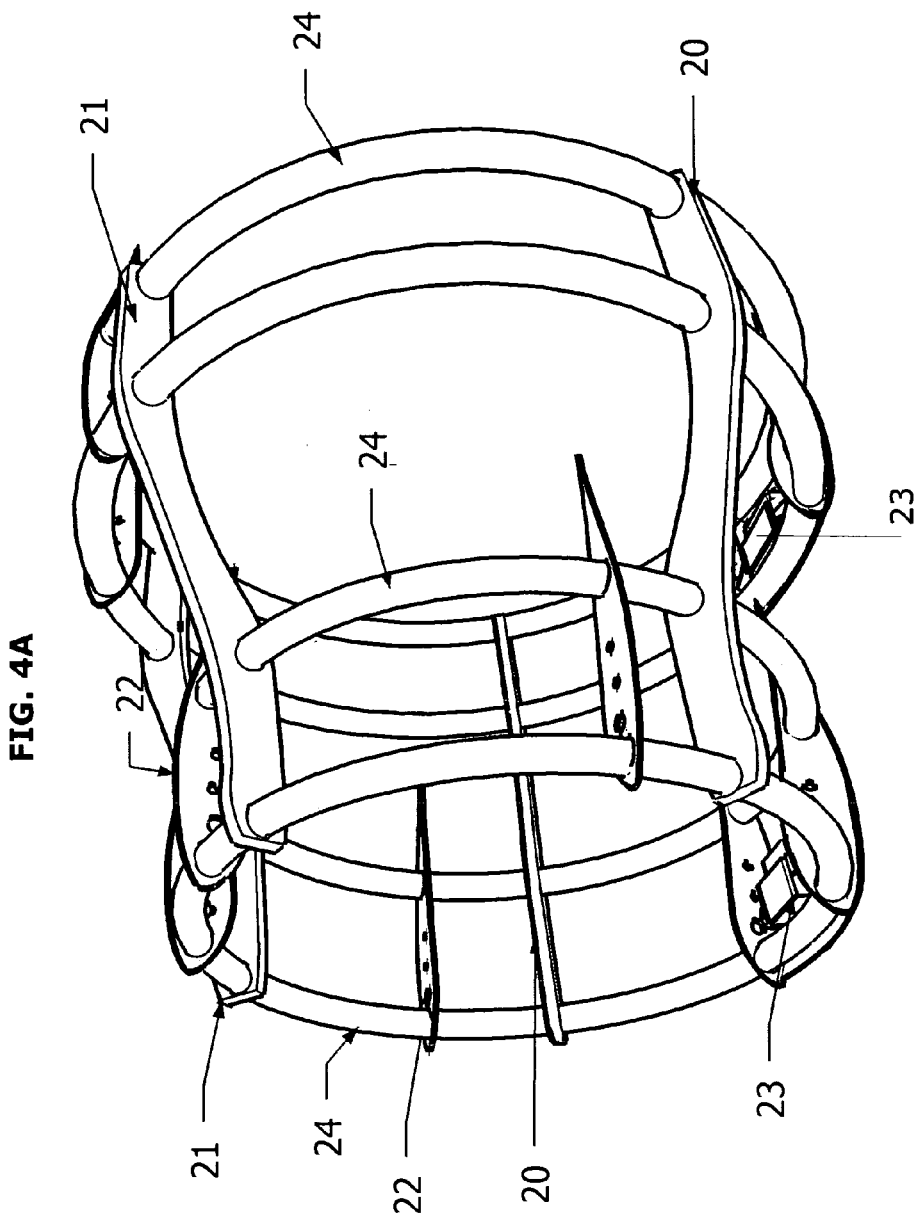

FIG. 4A is a framed-up view of the internal structure of the preferred embodiment. Two upper rib struts 21 and two lower rib struts 20 connect the frames of each annular wing. Enclosed in the lower section of each annular wing is a heating unit 23. Airfoil formers 22 provide the specific airfoil geometry and angle of incidence is set in place by tubular spars 24. The heating units 23 are placed strategically at the lower portion of the annular wing to allow for natural convection of heated air through the hollow frame. FIG. 4B is a close-up view of the internal mounted heating units 23 which may be sensor controlled to prevent ice-formation and buildup on the annular wings FIGS. 1A, 1 and 2.

Figure 5:
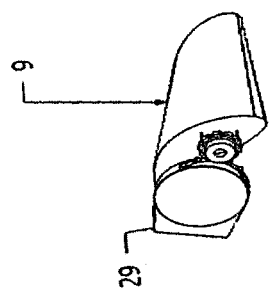
FIG. 5 depicts horizontal stabilizers with electro-mechanical apparatus for rotation about a pitch axis.
Figure 5:
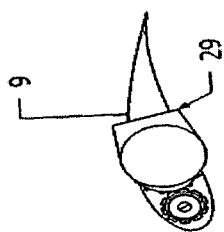

As shown in FIG. 5 the horizontal stabilizers 9 can optionally be made operable for rotation about a pitch axis, operated by electro-mechanical apparatus 29.

The foregoing Detailed Description of exemplary and preferred embodiments is presented for purposes of illustration and disclosure in accordance with the requirements of the law. It is not intended to be exhaustive nor to limit the invention to the precise form or forms described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. This disclosure has been made with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated.

The invention claimed is:

1. A horizontal axis wind turbine system comprising:
   at least two separate annular wings in a tandem axial configuration to define a forward annular wing and an after annular wing;
   further comprising two contra-rotating turbines each having a plurality of propellers to convert wind flowing past each turbine into torque thereby creating electricity via a generator connected to each turbine wherein one turbine is housed axially within the forward annular wing and another turbine is housed axially within the after annular wing; and
   further comprising a non-planar elliptical winglet as part of the propellers of either or both the first and the second turbine operable for laminar flow and reduced vorticity and re-circulation about a trailing edge at a wing-tip of the propellers.

2. The horizontal axis wind turbine system of claim 1 further comprising fixedly or variably mounted stator guide vanes which are affixed to the interior wall of either or both the forward and after annular wings.

3. The horizontal axis wind turbine system of claim 2 further comprising vortex generators mounted span-wise along low pressure surfaces of the stator guide vanes.

4. The horizontal axis wind turbine system of claim 1 further comprising fixed or variable stator guide vanes of airfoil geometry mounted on the inner surface wall of the forward annular wing at the trailing edge of the forward annular wing, whereby the stator guide vanes are operable to de-swirl the internal fluid flow stream downstream of the forward turbine.

5. The horizontal axis wind turbine system of claim 1 further comprising reaction control systems operably comprising horizontal stabilizers of selected airfoil geometry whereby the horizontal stabilizers may be set with selected angles of incidence aft of a center of gravity of the complete system to minimize buffeting and pitching moments common to ducted turbines.

6. The horizontal axis wind turbine of claim 1 further comprising a conical nacelle having the shape of an airfoil body for streamlined flow.

7. The horizontal axis wind turbine of claim 6 wherein the complete assembly is mounted to a tower, pole or other suitable structure as a modular design so as to allow passive yaw control of the complete assembly at an optimal angle of attack greater than 1 degree, relative to the oncoming wind.

8. The horizontal axis wind turbine system of claim 1 wherein each elliptical winglet comprises a flow conduit at a propeller tip having an entry proximate a leading edge of the propeller and an exit proximate a trailing edge of the propeller and the area of the entry is larger than the area of the exit whereby air passing through the winglet flows faster at the exit than it does at the entrance.

9. A horizontal axis wind turbine system comprising:
   at least two separate annular wings in a tandem axial configuration to define a forward annular wing and an after annular wing and having a center of gravity defining a portion of the system behind a center of gravity of the system;
   reaction control systems comprising horizontal stabilizers whereby the horizontal stabilizers may be set with varying angles of incidence behind the center of gravity of the system to minimize pitching moments;
   wherein the reaction control systems comprise means for containing aerodynamic twists; and
   further wherein the horizontal stabilizers have selected airfoil geometry, optionally operable with rotation about a pitch axis, operated by electro-mechanical apparatus.

10. The horizontal axis wind turbine system of claim 9 wherein the horizontal stabilizer is mounted to the after annular wing and may incorporate aerodynamic twist functioning to optimize passive yaw control.

11. The horizontal axis wind turbine system of claim 10 wherein the horizontal stabilizer may be mounted at a selected fixed angle of incidence or may be mounted as a variable geometry control surface with rotation about a yaw axis of the system, operated by electro-mechanical apparatus.

12. A horizontal axis wind turbine system comprising:
at least two separate annular wings in a tandem axial configuration to define a forward annular wing and an after annular wing and having a center of gravity defining a portion of the system behind a center of gravity of the system;
reaction control systems comprising horizontal stabilizers whereby the horizontal stabilizers may be set with a selected angle of incidence behind of the center of gravity of the system to minimize pitching moments common to ducted turbines; and
further wherein the horizontal stabilizers have selected airfoil geometry at selected angles of incidence, optionally operable with rotation about a pitch axis, operated by electro-mechanical apparatus.

* * * * *